United States Patent
Ramani et al.

(10) Patent No.: US 12,026,108 B1
(45) Date of Patent: Jul. 2, 2024

(54) LATENCY-BASED PERFORMANCE STATE CONTROL

(71) Applicant: Apple Inc., Cupertino, CA (US)

(72) Inventors: Karthik Ramani, San Jose, CA (US); Mohamed Ismail, Santa Clara, CA (US); Tian You Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 18/065,433

(22) Filed: Dec. 13, 2022

Related U.S. Application Data

(60) Provisional application No. 63/370,141, filed on Aug. 2, 2022.

(51) Int. Cl.
*G06F 13/16* (2006.01)
*G06F 11/34* (2006.01)
*G06F 12/0811* (2016.01)
*G06F 12/084* (2016.01)

(52) U.S. Cl.
CPC ...... *G06F 13/1689* (2013.01); *G06F 11/3466* (2013.01); *G06F 12/0811* (2013.01); *G06F 12/084* (2013.01)

(58) Field of Classification Search
CPC ............. G06F 13/1689; G06F 11/3466; G06F 12/0811; G06F 12/084
USPC .................................................. 711/154, 103
See application file for complete search history.

(56) References Cited

U.S. PATENT DOCUMENTS

| | | | |
|---|---|---|---|
| 2012/0066337 A1* | 3/2012 | Wu | G06F 3/0649 709/214 |
| 2012/0317364 A1 | 12/2012 | Loh | |
| 2014/0006696 A1 | 1/2014 | Ramanujan et al. | |
| 2014/0281311 A1* | 9/2014 | Walker | G06F 3/0631 711/170 |
| 2021/0173779 A1 | 6/2021 | Sutardja | |
| 2023/0132802 A1* | 5/2023 | Zoualfaghari | G06F 11/3419 702/182 |

* cited by examiner

*Primary Examiner* — Hashem Farrokh
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to controlling performance state of a memory element based on latency information for a processor. In some embodiments, a level of a memory hierarchy is configured to operate at multiple different performance states at different times. Processor circuitry may execute programs that generate requests to access the memory hierarchy. Bandwidth-based control circuitry may generate, based on bandwidth conditions for the processor circuitry, bandwidth performance state signals. Latency-based control circuitry may generate, based on latency information for processor requests to access the memory hierarchy, latency performance state signals. Performance control circuitry may control the performance state of the level of the memory hierarchy based on the bandwidth performance state signals and the latency performance state signals. Disclosed techniques may improve processor performance in certain operating scenarios.

20 Claims, 9 Drawing Sheets

*Example latency controller actions*

| Average number of transactions | Latency | Scenario description | Action |
|---|---|---|---|
| Low | Low | Not latency or bandwidth limited | Accumulate data, request move to lower P-state |
| Low | High | Latency limited | Request higher P-state |
| High | Low | BW limited | Accumulate data, request move to lower P-state |
| High | High | BW limited | Accumulate data, request move to lower P-state (defer to BW-based controller) |

FIG. 3

LATENCY-BASED PERFORMANCE STATE CONTROL

The present application claims priority to U.S. Provisional Application No. 63/370,141, filed Aug. 2, 2022 and titled "Latency-Based Performance State Control," the disclosure of which is incorporated by reference herein in its entirety.

BACKGROUND

Technical Field

This disclosure relates generally to computer processors and more particularly to performance state control based on latency of memory requests.

Description of the Related Art

Memory hierarchies often include one or more levels that can operate at multiple power/performance states (e.g., with different frequencies, operating voltages, etc.). A cache or memory, for example, may have different performance and power consumption characteristics in different performance states. Generally, lower performance states may be preferred to save power when appropriate, with ramping up to higher performance states when needed for certain workloads.

Certain clients may request increased or decreased performance states in different scenarios. As one example, a graphics processor may increase the performance state of a cache when it detects that it is operating under a high bandwidth (BW) scenario.

BRIEF DESCRIPTION OF THE DRAWINGS

FIG. 3 is a diagram illustrating example latency controller actions in different scenarios, according to some embodiments.

DETAILED DESCRIPTION

The present inventors recognized that there are scenarios in which a processor (e.g., a GPU) is latency-limited even when bandwidth is low. In this scenario, a traditional bandwidth-based performance state controller will not request to increase the performance state of memory circuitry (e.g., a cache), even though a higher performance state may help reduce latency for memory access requests.

Therefore, in disclosed embodiments, a latency-based controller is configured to operate in parallel with a bandwidth-based controller to control the performance state of a level in a memory hierarchy.

In some embodiments, the latency-based controller may implement filters to ramp up and ramp down performance state at different rates. In some embodiments, the latency-based controller may utilize latency histogram information to provide more efficient performance state control outputs.

Graphics Processing Overview

Figure 1A:
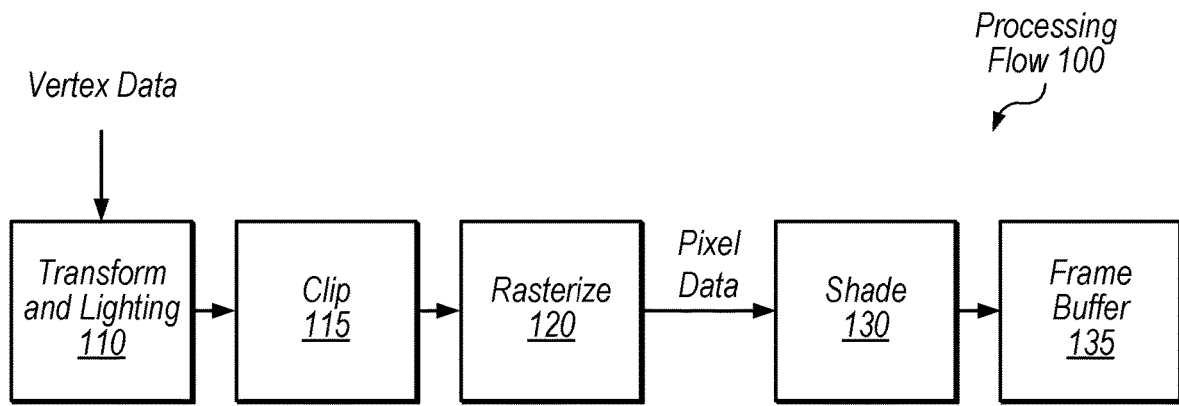
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
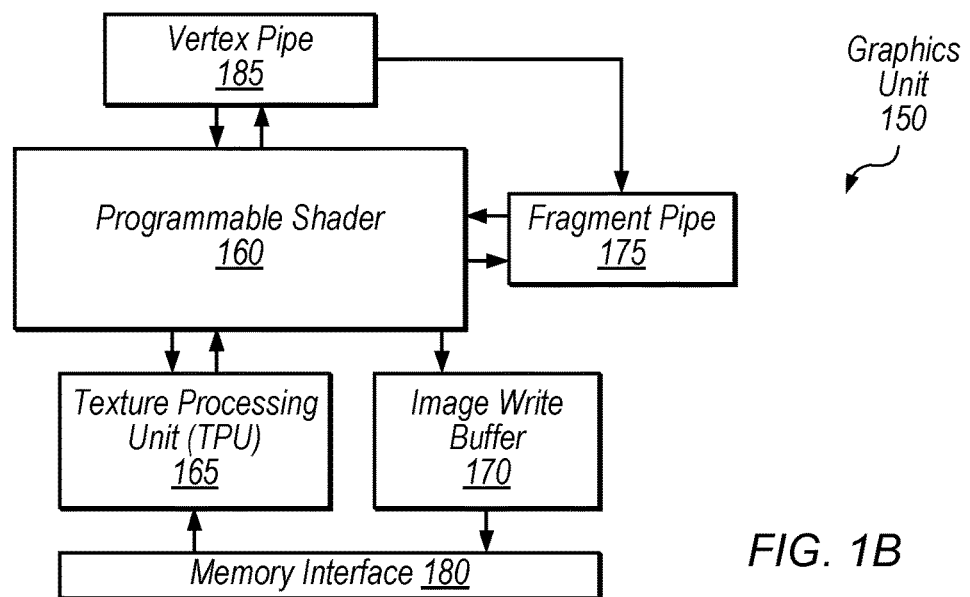
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data.

Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Latency-Based Performance Control

Figure 2:
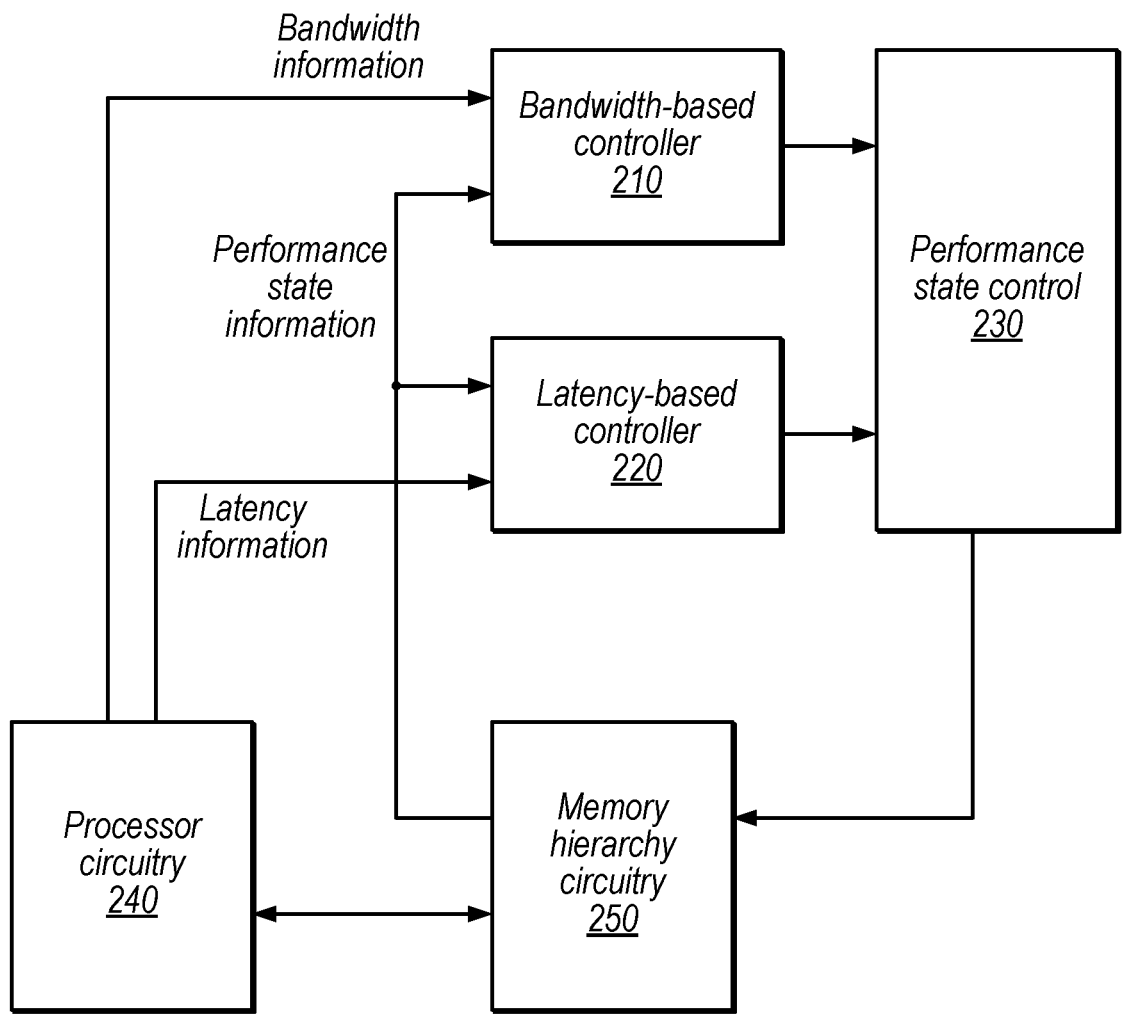
FIG. 2 is a block diagram illustrating example latency-based controller circuitry, according to some embodiments.

FIG. 2 is a block diagram illustrating an example system that includes a latency-based controller for storage circuitry, according to some embodiments. In the illustrated example, the system includes bandwidth-based controller 210, latency-based controller 220, performance state control 230, processor circuitry 240, and memory hierarchy circuitry 250.

Processor circuitry 240 may be a graphics processing unit (GPU) or central processing unit (CPU), for example. In other embodiments, processor circuitry 240 may be any of various types of processors, including a microcontroller or other type of firmware processor, for example. Processor circuitry 240 may perform various operations that access data in memory hierarchy circuitry 250. In the illustrated embodiment, processor circuitry 240 also generates bandwidth information and latency information that may be used to control the performance state of memory hierarchy circuitry 250, as discussed in detail below.

Memory hierarchy circuitry 250, in some embodiments, corresponds to a level in a cache/memory hierarchy for the system. For example, the hierarchy may include multiple levels of caches, a system memory, and one or more backing storages such as a solid-state drive. In some embodiments, memory hierarchy circuitry 250 is a cache. The cache may be shared for instructions and data or may be dedicated for instructions or for data. The cache may use any of various appropriate associativity topologies. The cache may be write-back or write-through. In some embodiments, the cache is a memory cache that is shared by multiple clients of a system-on-a-chip (SoC). In other embodiments, the cache is a lower-level cache, e.g., an L1 or L2 cache that may not be shared. In still other embodiments, memory hierarchy circuitry 250 may be a non-cache circuit, e.g., an SRAM or another type of memory.

Memory hierarchy circuitry 250 may be configured to operate in multiple different performance states at different times, e.g., based on control by performance state control 230. Different performance states may have various different characteristics, e.g., voltage levels, clock frequencies, amount of circuitry being powered down or clock gated, etc. The performance state of memory hierarchy circuitry 250 may impact its performance for accesses by processor circuitry 240, e.g., the bandwidth at which it can provide data, the latency for retrieving read data, etc. If memory hierarchy circuitry 250 is shared by other processor circuitry, activity by other clients may also impact performance for requests from processor circuitry 240.

Bandwidth-based controller 210, in the illustrated embodiment, is configured to generate performance state signals based on current performance state information and bandwidth information from processor circuitry 240.

Latency-based controller 220, in the illustrated embodiment, is configured to generate performance state signals based on current performance state information and latency information from processor circuitry 240. In some embodiments, a system includes multiple different latency-based controllers for different clients that share the same memory circuitry (e.g., a shared cache). Disclosed latency-based techniques may improve performance in certain operating scenarios, relative to techniques that consider bandwidth and not latency.

In some embodiments, latency-based controller 220 may utilize latency information for only certain types of requests. For example, controller 220 may operate based on latency of one or more of: read traffic, high priority traffic, traffic of a certain class or virtual channel, etc.

Performance state control circuitry 230, in some embodiments, is configured to control the performance state of memory hierarchy circuitry 250 based on the performance state signals from both bandwidth-based controller 210 and latency-based controller 220. In some embodiments, performance state control 230 is configured to select the greatest performance state indicated by controller 210 and 220. In other embodiments, performance state control may weigh or logically combine signals from different controllers using various techniques. The signaling from controllers 210 and 220 may indicate requested performance states directly or may provide more granular status information that may be used by performance state control 230 to select a performance state.

FIG. 3 is a diagram illustrating example latency controller actions in different scenarios, according to some embodiments. In the illustrated example, four scenarios with different bandwidth and latency conditions are shown, although various appropriate numbers of thresholds for various operating conditions may be considered in other embodiments.

When bandwidth (number of outstanding transactions) is low and latency is low, processor 240 is not bandwidth or latency limited and the latency-based controller 220 is configured to continue accumulating latency data and request a move to a lower performance state (the bandwidth-based controller 210 may also request a move to a lower performance state in this scenario). Note that the latency may be determined as average latency (which may be determined as geometric mean latency, harmonic mean latency, etc.), tail latency, latency information from a histogram, etc., and latency may be compared to various different thresholds (although a high/low comparison to a single threshold is shown in FIG. 3).

When bandwidth is low and latency is high, processor 240 is considered latency limited and latency-based controller 220 requests a higher performance state. This may improve performance for processor 240 when latency is important, even in low-bandwidth situations. For real-time applications such as graphics processing, latency performance may be particularly important. In some embodiments, processor 240 is configured to provide both latency information and signaling that indicates whether latency is currently a priority. If latency is not a priority for the current workload, latency-based controller 220 may not request an increased performance state even when a latency threshold is met.

When bandwidth is high, as in the last two rows of the illustrated example, the system is bandwidth limited and the latency-based controller 220 defers to the bandwidth-based controller 210 (in this example, deferring includes continuing to aggregate latency information and requesting a move to a lower performance state). In other embodiments, latency-based controller 220 may not defer in these scenarios, the signaling from the different controllers may be logically combined, or disclosed latency-based control techniques may be used without a bandwidth-based controller.

Latency-based controller 220 may use various techniques to determine latency conditions and whether threshold(s) are met for requesting a different performance state. As one example, latency-based controller 220 may determine a total number of memory requests made by processor circuitry 240 to memory hierarchy circuitry 250 over a time window. Latency-based controller 220 may also determine the average number of cycles spent by requests (e.g., via a communications fabric or some other interface) from processor circuitry 240 to memory hierarchy circuitry 250.

Latency-based controller 220 may determine the average latency per transaction based on an aggregate number of cycles spent by requests over the decision window divided by the total number of memory requests during the window. Latency-based controller 220 may also determine average number of outstanding transactions, e.g., using a counter in processor circuitry 240 that counts every request or every N requests.

Note that latency-based controller 220 may be on a different voltage rail than processor circuitry 240 and may not know the performance state of the processor 240. In these embodiments, the average number of outstanding transactions may be based on the average number of cycles spent by requests divided by the number of processor circuitry 240 cycles elapsed over the time window, e.g., as reported by the processor circuitry 240.

In some embodiments, average latency per transaction above a threshold and an average number of outstanding transactions below a threshold may indicate that the processor circuitry 240 is latency limited, in which case latency-based controller 220 may request a performance state increase. When the processor is not latency limited, latency-based controller 220 may defer to bandwidth-based controller 210.

Note that the latency for a given request may correspond to the round-trip time between issuing the request and receiving a response. In some embodiments, only a portion of the latency may be measured, e.g., the round-trip time on a communications fabric (e.g., because the latency before the request enters the fabric and after the response exits the fabric may be fairly consistent). In other embodiments, the entire latency may be measured. In still other embodiments, latency in one direction may be measured rather than round-trip latency.

In other embodiments, the system may maintain more detailed latency information, based on which latency-based controller 220 may generate performance state signaling. For example, latency-based controller 220 may use histogram circuitry to maintain latency histogram information.

Example Histogram Formats

Figure 4:
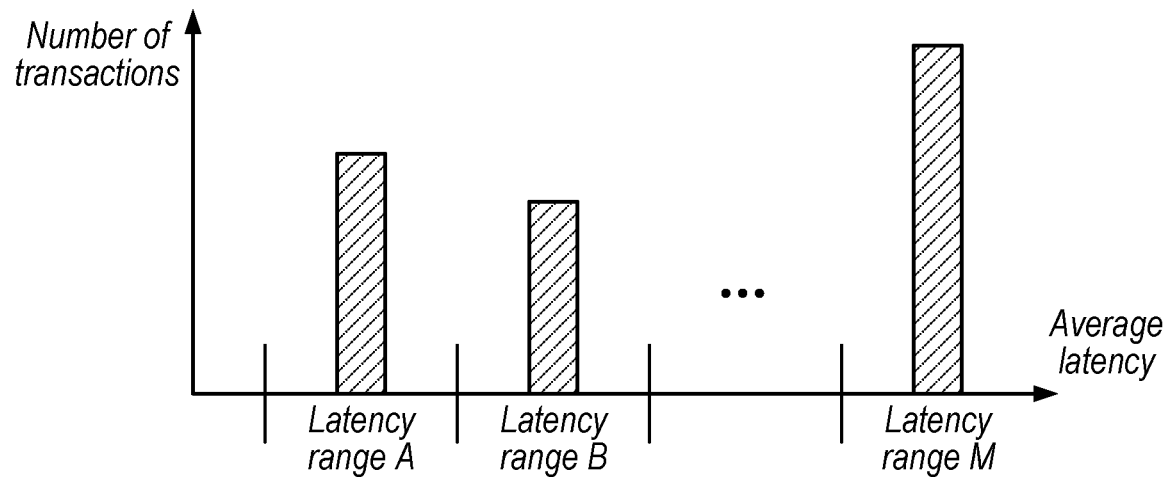
FIGS. 4 and 5 are diagrams illustrating example histogram formats for tracking latency information, according to some embodiments.
Figure 5:
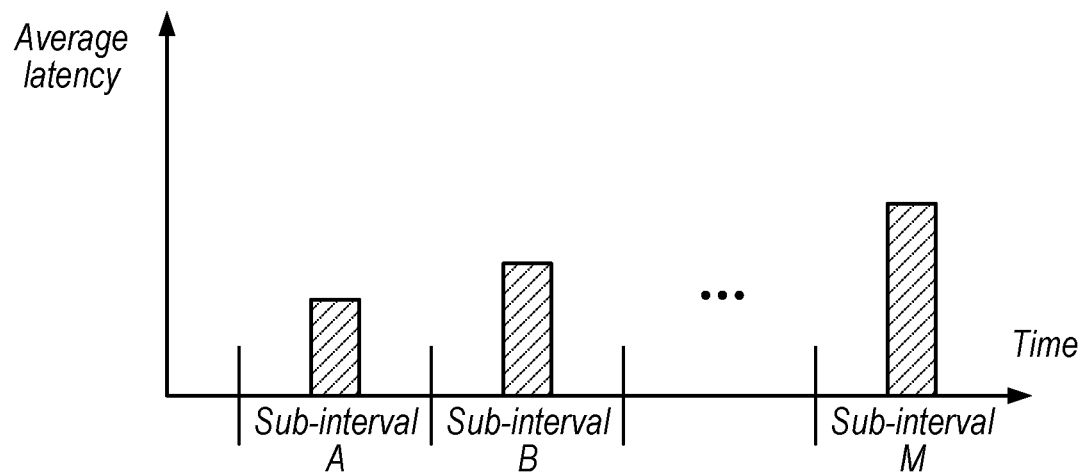

FIGS. 4-5 are diagrams illustrating example histogram formats, according to some embodiments. The format shown in FIG. 4 tracks the number of transactions in multiple different average latency buckets, over a time interval. Various widths of ranges may be used to classify transactions based on tradeoffs between desired accuracy and the amount of information tracked.

The format shown in FIG. 5 tracks the average latency of transactions over different time sub-intervals. For example, the average latency of transactions in sub-interval A is different than the average latency of transactions in sub-interval B. Various lengths of sub-intervals may be used to classify transactions based on tradeoffs between desired accuracy and the amount of information tracked. As mentioned above, other latency characteristics such as tail latency of traffic distribution. may be tracked in place of or in addition to average latency.

In some embodiments, both formats may be used to track latency information and latency-based controller 220 may generate control signaling based on both types of information. For a given histogram format, counter circuitry may maintain information indicating the value for a given bucket and histogram control circuitry may analyze all or a portion of requests (e.g., a pseudo-random subset of requests) to appropriately increment the counters.

In various embodiments, latency-based controller 220 may generate performance state control signaling based on various thresholds relating to histogram data (e.g., for different buckets), logical or arithmetic operations based on histogram bucket values, etc.

While use of histogram-based tracking may increase chip area and power consumption for performance state control, higher-fidelity latency information may improve performance.

Example Bandwidth Histogram and Derived Latency

In some embodiments, histogram circuitry is configured to generate bandwidth histogram information. Control circuitry may utilize counters to track bandwidth at a fabric boundary post-memory management unit (MMU) to determine overall memory bandwidth for a component such as the GPU. The histogram circuitry may be included in the MMU. The histogram data may be available to fixed-function power control circuitry, GPU firmware, power management processor firmware (e.g., executed by performance state control 230), or some combination thereof.

In some embodiments, the bandwidth is encoded using N counters, where each counter represents a bin covering 1/Nth of the maximum bandwidth. Thus, the histogram may provide the fraction of transactions that fall in each bandwidth bucket. In some embodiments, the counters saturate when their maximum value is reached in a given sampling window.

Based on the bandwidth histogram, control circuitry or firmware derives latency from the bandwidth histogram, e.g., based on a determined average latency and knowledge of bandwidth capabilities, in some embodiments. The derived latency may be a histogram or may encode other latency characteristics. Generally, knowing the fraction of transactions falling in each of multiple bandwidth buckets may allow application of a distribution to the bandwidth values based on average latency (and may allow flexible or programmable distributions to be applied). This may further facilitate determining tail latency. Tail latency refers to latency of a small percentage of response times that are the longest, which may be particularly important in the GPU context where substantial tail latency may cause visual artifacts.

In some embodiments, performance state control 230 is configured to take action based on tail latency (or other latency characteristics) in addition to or in place of average latency. For example, referring to FIG. 3, performance state control 230 may request a higher performance state when tail latency is above a threshold, even when the average number of outstanding transactions is low. More generally, performance state control 230 may take action based on latency for a certain portion of transactions (e.g., latency characteristics for the 5% of transactions with the highest latency) rather than average latency for all transactions.

In some embodiments, the bandwidth histogram utilizes separate sets of counters for read and write bandwidth. In some embodiments, the sampling window for the counters is programmable. The counters may be addressable and may be reset at the end of a sampling window. Control circuitry may copy the histogram into a software-accessible configuration register at the end of the sampling window.

In some embodiments, counter circuitry separately tracks the total number of MMU requests via a fabric and the number of MMU requests to memory. In some embodiments, histogram circuitry operates using an always-on clock signal.

Example Ramp Techniques

Figure 6:
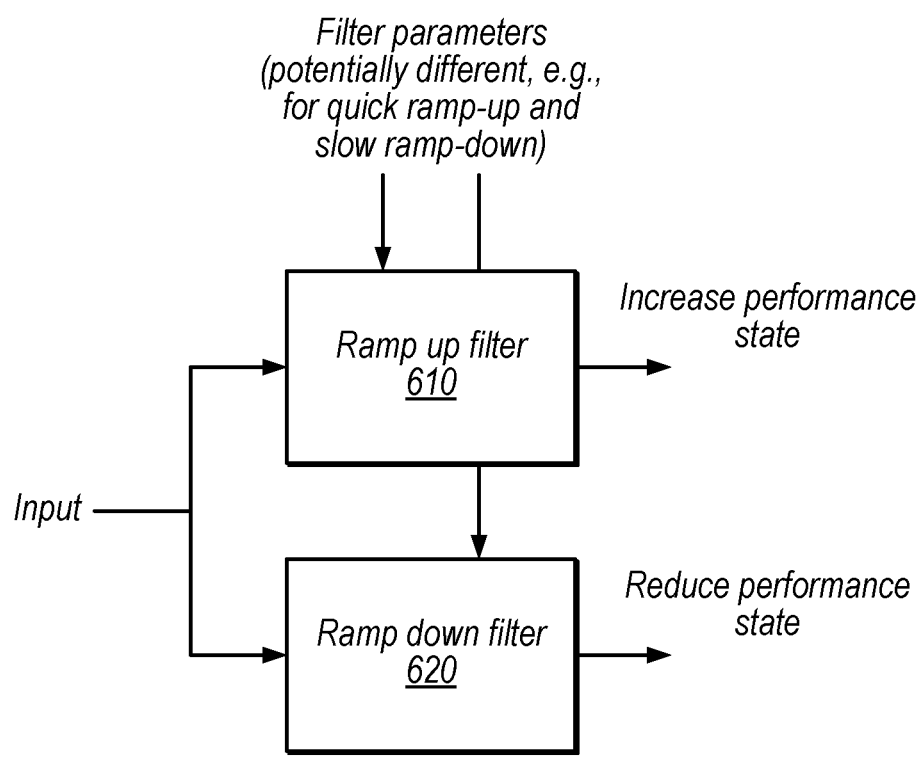
FIG. 6 is a block diagram illustrating example ramp-up and ramp-down filters, according to some embodiments.

FIG. 6 is a diagram illustrating example filter circuitry configured to control performance change requests, according to some embodiments. In the illustrated example, latency-based controller 220 provides inputs (e.g., various latency data discussed above) to ramp up filter 610 and ramp down filter 620. The filters 610 and 620 operate on filter parameters, which may be fixed or programmable. In some embodiments, the system uses different filter parameters for ramp up than for ramp down. For example, the system may ramp up more rapidly to provide latency performance and ramp down more slowly, e.g., to avoid providing poor latency performance for some requests that may occur if ramping down too quickly. As one example, filters may ramp more slowly by accumulating data over a longer decision window before considering a change.

As one example, the ramp up filter may operate based on data from M previous windows while the ramp down filter may operate based on data from N previous windows, where N is greater than M. Note that bandwidth-based controller 210 may utilize similar ramping techniques.

In some embodiments, the system may use different ramping techniques for different performance states. For example, ramping rate may be different when operating in relatively higher performance states (e.g., with slower ramp-up when already in a higher performance state) than for lower performance states.

Example Method

Figure 7:
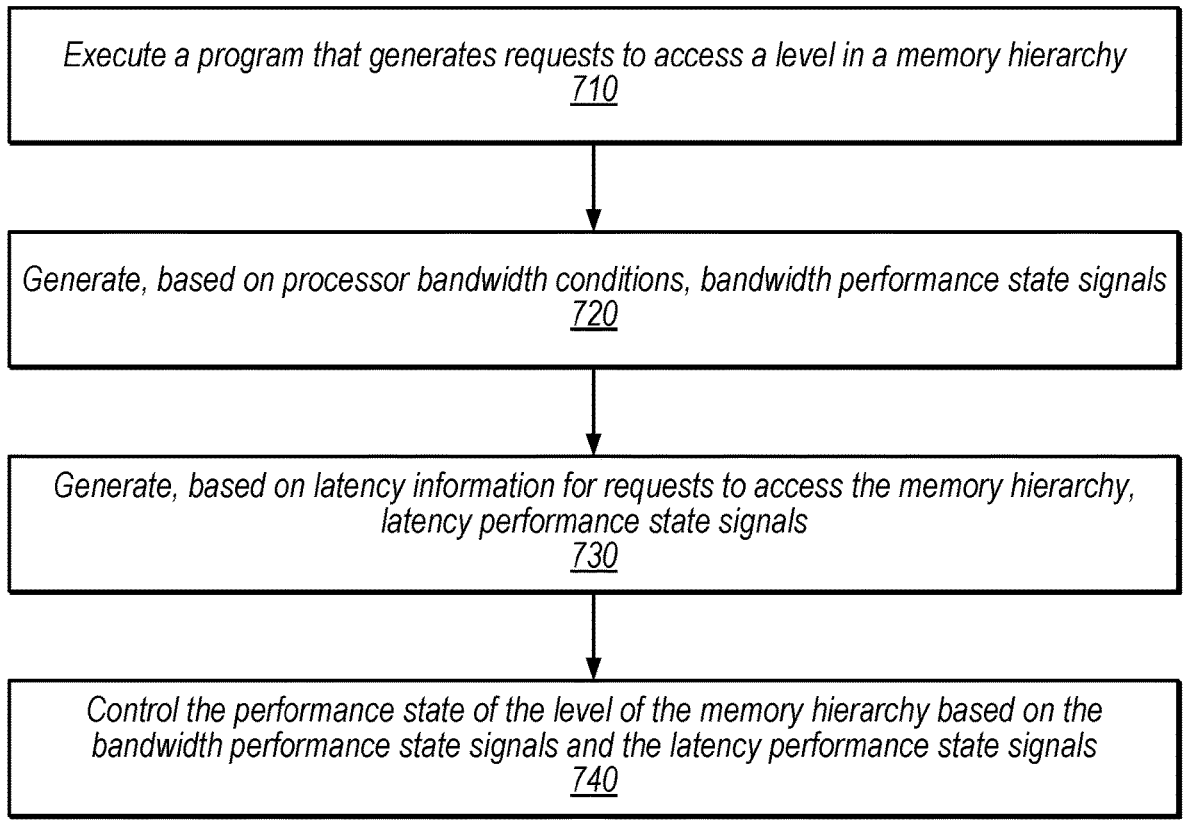
FIG. 7 is a flow diagram illustrating an example method, according to some embodiments.

FIG. 7 is a flow diagram illustrating an example method for latency-based performance control for an element of a memory hierarchy, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a processor executes a program that generates requests to access a level in a memory hierarchy. In some embodiments, the level is a data cache. The data cache may be a memory cache that is shared with one or more other processors.

At 720, in the illustrated embodiment, the processor generates, based on bandwidth conditions for the processor, bandwidth performance state signals.

At 730, in the illustrated embodiment, the processor generates, based on latency information for processor requests to access the memory hierarchy, latency performance state signals. In some embodiments, latency-based control circuitry is configured to generate the latency performance state signals based on average latency per request and average number of outstanding requests. The control circuitry may determine the average latency per request based on average number of cycles spent by requests and a total number of requests over a time interval. The control circuitry may determine the average number of outstanding requests based on average number of cycles spent by requests and the number of processor cycles elapsed during the time interval. Note that the latency information may be determined specifically for requests to the level of the memory hierarchy and may not include latency information for requests to other levels.

In some embodiments, latency-based control circuitry is configured to track, using histogram circuitry, latency information over a decision window and generate the latency performance state signals based on the histogram data structure. In some embodiments, the histogram circuitry stores, for multiple sub-intervals of the decision window, average latency of requests in a given sub-interval. In some embodiments, the histogram circuitry stores, for multiple different latency ranges, numbers of requests in the decision window that fall within a given latency range.

At 740, in the illustrated embodiment, the processor controls the performance state of the level of the memory hierarchy based on the bandwidth performance state signals and the latency performance state signals.

In some embodiments, the performance control circuitry is configured to increase the performance state of the level of the memory hierarchy in a situation where the bandwidth conditions do not meet a bandwidth threshold and latency information for processor requests meets a latency threshold. In some embodiments, the performance control circuitry is configured to select the greatest performance state from among performance states indicated by the bandwidth performance state signals and the latency performance state signals.

In some embodiments, the performance control circuitry includes filter circuitry configured to determine when to change the performance state of the level of the memory hierarchy based on one or more filter parameters, including to filter latency data over a smaller window when increasing the performance state than when decreasing the performance state. In some embodiments, filtering may use different windows for different current performance states.

Example Device

Figure 8:
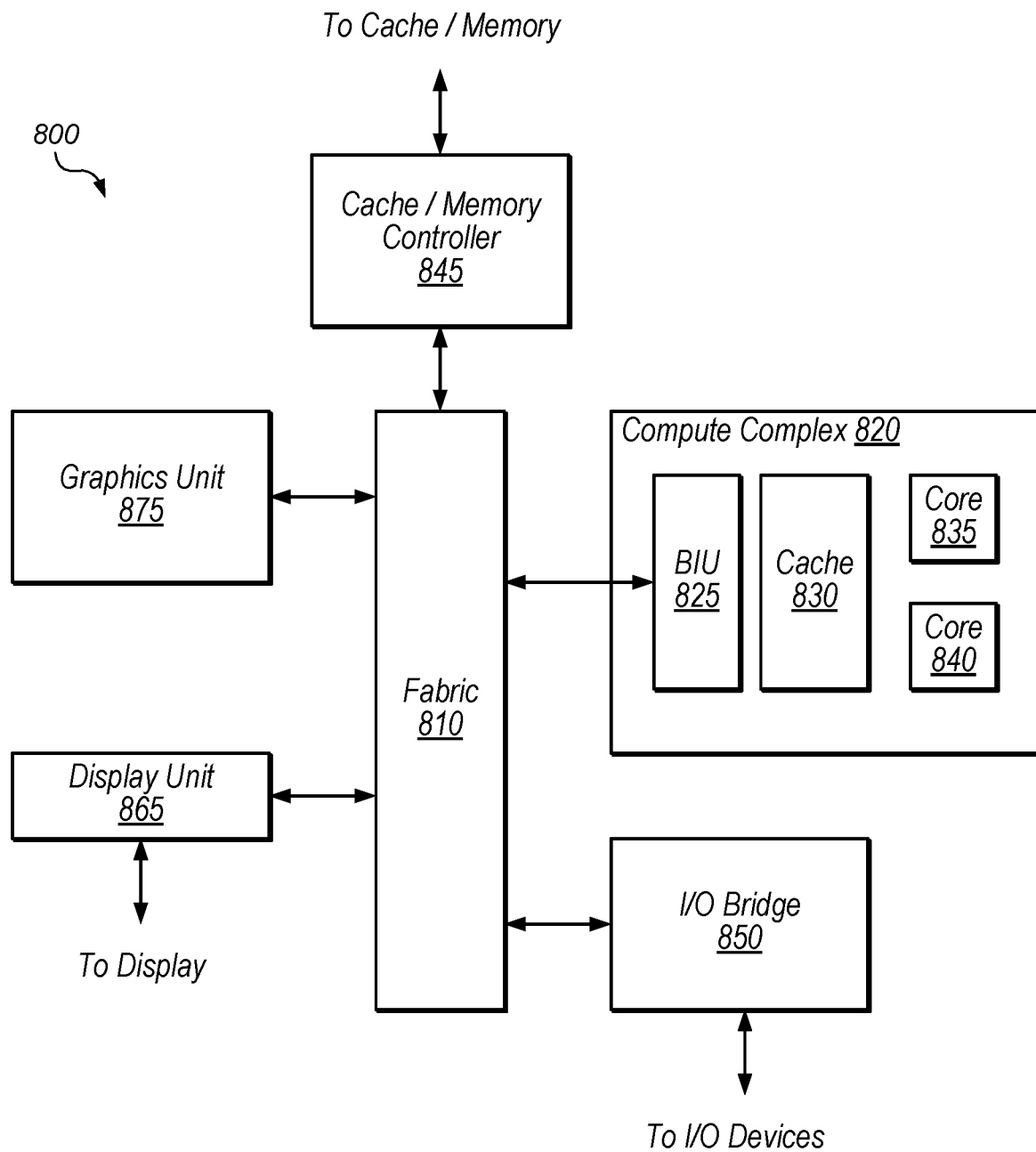
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUXes, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

In some embodiments, disclosed techniques may improve the performance of compute complex 820 under certain operating conditions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

In some embodiments, cache/memory controller 845 controls a memory cache and controls the performance state of the memory cache based on latency information for graphics unit 875, compute complex 820, or both. In other embodiments, disclosed techniques may be used to control performance state of various other caches in device 800, in addition to or in place of the memory cache.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may improve the performance of graphics unit 875 under certain operating conditions.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded DisplayPort (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
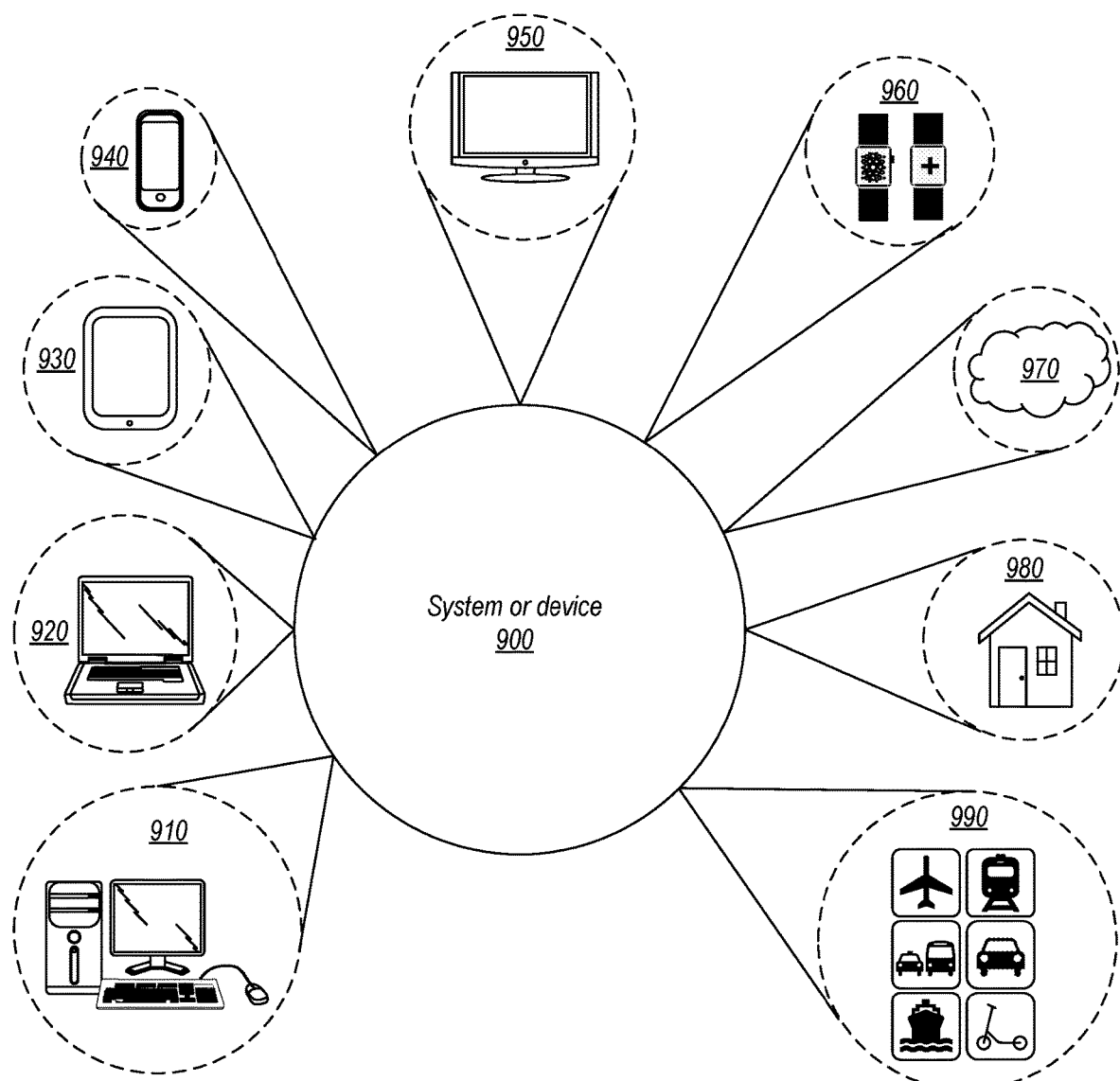
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IOT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
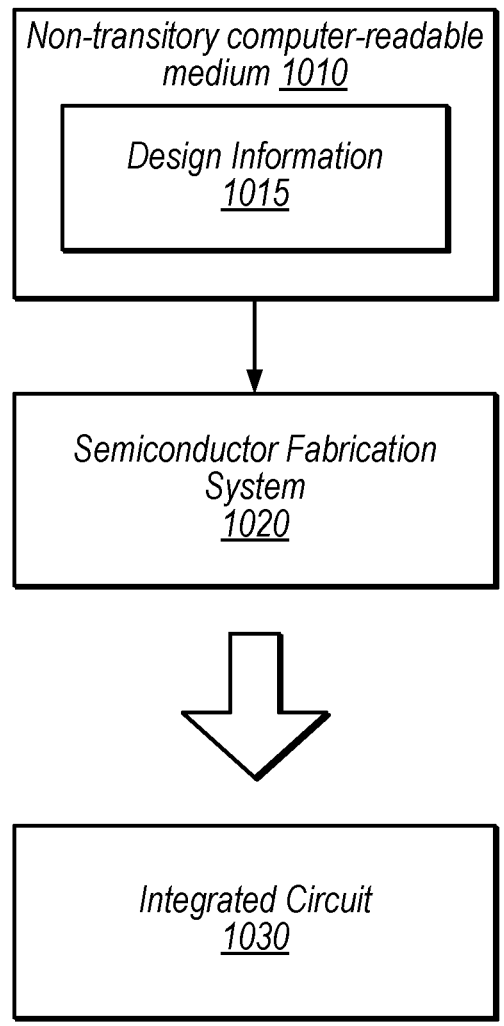
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1B, 2, 4, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations.

It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
 a memory hierarchy comprising multiple memories arranged according to a hierarchy of levels, wherein a level of the memory hierarchy is configured to operate at multiple different performance states at different times;
 processor circuitry configured to execute programs, including to generate requests to access the memory hierarchy;
 bandwidth-based control circuitry configured to generate, based on bandwidth conditions for the processor circuitry, bandwidth performance state signals;

latency-based control circuitry configured to generate, based on latency information for processor requests to access the memory hierarchy, latency performance state signals; and performance control circuitry configured to control the performance state of the level of the memory hierarchy based on the bandwidth performance state signals and the latency performance state signals.

2. The apparatus of claim 1, wherein control of the level of the memory hierarchy includes controlling performance state of a data cache.

3. The apparatus of claim 2, wherein the data cache is a memory cache that is shared with one or more other processors.

4. The apparatus of claim 1, wherein the performance control circuitry is configured to increase the performance state of the level of the memory hierarchy in a situation where the bandwidth conditions do not meet a bandwidth threshold and latency information for processor requests meets a latency threshold.

5. The apparatus of claim 1, wherein the performance control circuitry is configured to select the greatest performance state from among performance states indicated by the bandwidth performance state signals and the latency performance state signals.

6. The apparatus of claim 1, wherein the performance control circuitry includes:

filter circuitry configured to determine when to change the performance state of the level of the memory hierarchy based on one or more filter parameters, including to filter latency data over a smaller window when increasing the performance state than when decreasing the performance state.

7. The apparatus of claim 1, further comprising control circuitry configured to:

track bandwidth histogram information; and derive the latency information based on the bandwidth histogram information.

8. The apparatus of claim 7, wherein the bandwidth histogram information is generated using counters and indicates transactions falling within different bandwidth bins over a sampling window, wherein the bandwidth bins cover different portions of an overall bandwidth capability of the apparatus.

9. The apparatus of claim 7, wherein the derived latency information includes tail latency information.

10. The apparatus of claim 1, wherein the latency-based control circuitry is configured to generate the latency performance state signals based on:

average latency per request; and average number of outstanding requests.

11. The apparatus of claim 10, wherein the latency-based control circuitry is configured to determine:

the average latency per request based on average number of cycles spent by requests and a total number of requests over a time interval; and the average number of outstanding requests based on average number of cycles spent by requests and the number of processor cycles elapsed during the time interval.

12. The apparatus of claim 1, wherein the latency-based control circuitry is configured to:

track, using histogram circuitry, latency information over a decision window; and generate the latency performance state signals based on the tracked latency information over the decision window.

13. The apparatus of claim 12, wherein the histogram circuitry stores, for multiple sub-intervals of the decision window, average latency of requests in a given sub-interval.

14. The apparatus of claim 12, wherein the histogram circuitry stores, for multiple different latency ranges, numbers of requests in the decision window that fall within a given latency range.

15. The apparatus of claim 1, wherein the processor circuitry includes:

a plurality of single-instruction multiple-data pipelines configured to execute instructions; and fixed-function circuitry configured to control the single-instruction multiple-data pipelines to perform operations for at least one of the following types of programs:

graphics shader programs; and machine learning programs.

16. The apparatus of claim 1, wherein the apparatus is a computing device that further comprises:

a display;

a central processing unit; and a network interface.

17. A method, comprising:

executing, by a processor, a program that generates requests to access a level in a memory hierarchy;

generating, by the processor, based on bandwidth conditions for the processor, bandwidth performance state signals;

generating, by the processor, based on latency information for processor requests to access the memory hierarchy, latency performance state signals; and controlling, by the processor, the performance state of the level of the memory hierarchy based on the bandwidth performance state signals and the latency performance state signals.

18. The method of claim 17, wherein the controlling includes increasing the performance state of the level of the memory hierarchy in a situation where the bandwidth conditions do not meet a bandwidth threshold and latency information for processor requests meets a latency threshold.

19. A non-transitory computer-readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

a memory hierarchy comprising multiple memories arranged according to a hierarchy of levels, wherein a level of the memory hierarchy is configured to operate at multiple different performance states at different times;

processor circuitry configured to execute programs, including to generate requests to access the memory hierarchy;

bandwidth-based control circuitry configured to generate, based on bandwidth conditions for the processor circuitry, bandwidth performance state signals;

latency-based control circuitry configured to generate, based on latency information for processor requests to access the memory hierarchy, latency performance state signals; and performance control circuitry configured to control the performance state of the level of the memory hierarchy based on the bandwidth performance state signals and the latency performance state signals.

20. The non-transitory computer-readable storage medium of claim 19, wherein the latency-based control circuitry is configured to:
- track, using histogram circuitry, latency information over a decision window; and
- generate the latency performance state signals based on the tracked latency information over the decision window.

* * * * *